United States Patent

Staples et al.

[11] Patent Number: 5,994,440
[45] Date of Patent: *Nov. 30, 1999

[54] ABSORBENT POLYMER HAVING REDUCED DUSTING TENDENCIES

[75] Inventors: Thomas L. Staples; Warren L. Treptow; Stewart P. Wood, all of Midland, Mich.

[73] Assignee: The Dow Chemical Company, Midland, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/501,104
[22] PCT Filed: Mar. 29, 1993
[86] PCT No.: PCT/US93/02872
§ 371 Date: Oct. 31, 1995
§ 102(e) Date: Oct. 31, 1995
[87] PCT Pub. No.: WO94/22940
PCT Pub. Date: Oct. 13, 1994

[51] Int. Cl.[6] .............. C08K 5/06; C08K 5/05; C08J 3/12
[52] U.S. Cl. .............. 524/377; 524/388; 524/375; 524/376
[58] Field of Search .............. 524/388, 386, 524/379, 376, 377, 378, 375

[56] References Cited

U.S. PATENT DOCUMENTS

| | | |
|---|---|---|
| 4,080,358 | 3/1978 | Krumel et al. . |
| 4,702,116 | 10/1987 | Gawol .............. 73/865.6 |
| 4,734,478 | 3/1988 | Tsubakimoto et al. .......... 527/300 |
| 4,761,990 | 8/1988 | Baillie .............. 73/7 |
| 5,112,902 | 5/1992 | Moriya et al. .............. 524/503 |
| 5,147,343 | 9/1992 | Kellenberger .............. 604/368 |
| 5,346,986 | 9/1994 | Schneider et al. .............. 528/495 |
| 5,681,878 | 10/1997 | Klotzsche et al. .............. 524/269 |

FOREIGN PATENT DOCUMENTS

| | | |
|---|---|---|
| 0443627 A2 | 2/1991 | European Pat. Off. . |
| 61-184399 | 2/1988 | Japan . |
| 9118042 | 11/1991 | WIPO .............. C08J 3/12 |
| 9220727 | 11/1992 | WIPO .............. C08J 3/12 |

OTHER PUBLICATIONS

Derwent Abstract, Japanese 63039934–A, Sanyo Chem. Ind. Ltd.

Japanese Abstract 63030554, U. Kazuo et al., Mitsui Saianamitsudo KK, Feb. 9, 1988.

Japanese Abstract 63208741, M. Takenobu et al., Tokyo Electron Ltd., Aug. 30, 1988.

*Primary Examiner*—Christopher Henderson

[57] ABSTRACT

The invention provides water-swellable polymer compositions having reduced dusting tendencies, i.e, reduced amounts of unassoiated dust having a maximum diameter less than or equal to 10 microns and/or the tendency to generate reduced amounts of unassociatcd dust having a maximum diameter less than or equal to 10 microns upon attrition, and a process for preparing such compositions.

20 Claims, No Drawings

5,994,440

ABSORBENT POLYMER HAVING REDUCED DUSTING TENDENCIES

BACKGROUND OF THE INVENTION

The subject invention pertains to an absorbent polymer having reduced levels of unassociated dust, to an attrition-resistant absorbent polymer and to a process for the preparation of such polymers, and to a process for determining the amount of unassociated matter having a diameter less than or equal to a predetermined size.

In the gel polymerization of water-swellable polymers, monomers are polymerized in aqueous solution. Certain additives, such as crosslinking agents, may be incorporated into the monomer mixture. The product of the polymerization process is typically dried and subjected to mechanical means of particle size reduction and classification including chopping, grinding, and sieving. During such particle size reduction, ultrafine particles or dust, i.e., particles having a mean diameter less than about 10 microns, are unavoidably created.

Japanese Patent Application 6200745-A discloses a water-swellable resin composition having low levels of dust prepared by treating the polymer with an aqueous solution of a salt and/or hydroxide of a polyvalent metal, the salt and/or hydroxide of the polyvalent metal being provided in the amount of 0.01 to 10 weight percent, based on the weight of the dried polymer.

European Patent Application 103,058 discloses a water-absorbent material consisting of an intimate mixture of 5 to 95 weight percent particulate hydrogel material and 95 to 5 weight percent filler material, which filler material has been treated with up to 1 weight percent of a surfactant. The disclosed materials are said to have reduced dusting tendencies. The disclosed technology, however, would not lead to decreased dusting or the decreased attrition at the site of the manufacture of the hydrogel or during subsequent transport and handling of the hydrogel.

U.S. Pat. No. 4,080,358 discloses a low dusting, free-flowing composition comprising a mixture of a water-soluble acrylamide polymer primarily of a particle size less than 0.5 mm, from 0.1 to 0.5 weight percent based on the weight of the acrylamide of an antidusting agent, e.g., a propylene oxide adduct of glycerol of an average molecular weight between 500 and 2000, and from 1 to 80 weight percent of a highly silicious free-flow aid of submicron to 10 micron particle size.

U.S. Pat. No. 4,734,478 discloses a water-swellable polymer wherein the molecular chains near the surface of the particles are crosslinked. The polymer is prepared by mixing 100 parts water-swellable powder with from 0.001 to 10 parts polyhydric alcohol, and heating the mixture to 90° C. or more to react them. The surface crosslinked particles are said to have no decrease in flowability.

Industry would find great advantage in an aqueous fluid absorbent material which does not dust, e.g., which comprises no more than 2.5 ppm unassociated particles less than 10 microns in diameter. Industry would further find advantage in an attrition-resistant aqueous fluid absorbent material, e.g., which comprises no more than 35 ppm unassociated dust upon roll-milling for 20 minutes, and/or which comprises no more than 15 ppm unassociated dust upon roll-milling for 10 minutes. Industry would further find advantage in a process for reducing the level of particles less than 10 microns in diameter in a given composition by at least 90 percent. Industry would further find advantage in a process for ascertaining the amount of unassociated dust in a water-swellable polymer composition.

SUMMARY OF THE INVENTION

Accordingly, the subject invention provides a composition comprising water-swellable gel-polymerized polymer particles, the particles bearing on their surface a physical coating of a dedusting agent, wherein the composition comprises no more than 2.5 ppm unassociated dust having a maximum diameter less than or equal to 10 microns and wherein the composition is characterized by the ability to absorb at least 20 grams of a 0.9 weight percent aqueous saline solution under a pressure of 0.3 psi (21,000 dynes/cm$^2$), i.e., a 60 minute 0.3 psi (21,000 dynes/cm$^2$) AUL greater than 20 grams/gram as measured in accordance with the Absorption Under Load Test set forth in U.S. Pat. No. 5,147,343, incorporated herein by reference.

The subject invention further provides an attrition-resistant composition comprising water-swellable gel-polymerized polymer particles, the particles bearing on their surface a physical coating of a dedusting agent, wherein the composition is characterized by a 60 minute 0.3 psi (21,000 dynes/cm$^2$) AUL greater than 20 grams/gram comprises no more than 35 ppm unassociated dust having a maximum diameter less than or equal to 10 microns upon being roll milled for 20 minutes and/or which comprises no more than 15 ppm unassociated dust having a maximum diameter less than or equal to 10 microns upon being roll milled for 10 minutes.

The subject invention further provides a process comprising:

(a) preparing a water-swellable hydrogel by a gel polymerization process;

(b) drying and sizing the hydrogel to form a composition comprising dried and sized particles, the composition comprising a first amount of unassociated dust having a maximum diameter less than or equal to 10 microns; and (c) contacting the composition with a dedusting agent to form a dedusted composition, wherein the dedusted composition is characterized by a 60 minute 0.3 psi (21,000 dynes/cm$^2$) AUL greater than 20 grams/gram whereupon the dedusted composition comprises a second amount of unassociated dust having a maximum diameter less than or equal to 10 microns, the second amount being less than about 10 percent of the first amount.

The subject invention further provides a process comprising:

(a) preparing a water-swellable hydrogel by a gel polymerization process;

(b) drying and sizing the hydrogel to form a composition comprising dried and sized particles, the composition comprising a first amount of unassociated dust having a maximum diameter less than or equal to 10 microns; and (c) contacting the composition with a dedusting agent to form an attrition resistant composition characterized by a 60 minute 0.3 psi (21,000 dynes/cm$^2$) AUL greater than 20 grams/gram and by a tendency to generate a second amount of unassociated dust having a maximum diameter less than or equal to 10 microns upon roll milling of the attrition resistant composition for 10 minutes, the second amount being less than or equal to the first amount.

The subject invention further provides a process for measuring the amount of unassociated matter having a diameter less than a predetermined size present in a water-swellable polymer composition comprising:

(a) placing the composition into the sample holder of a pulsed jet disperser;

(b) blasting the composition with air dried by passage through dehydration means; and (c) determining the weight of particles in each of a plurality of size increments.

DETAILED DESCRIPTION OF THE INVENTION

As used herein, the term "unassociated dust" means the portion of a water-absorbent polymer particle composition having a maximum diameter less than or equal to 10 microns, which portion is rendered airborne when a blast of air is applied to the composition, e.g., as occurs during the measurement of unassociated dust using an AEROSIZER™ pulsed jet disperser described below.

As used herein the term "physical coating" means that the dedusting composition is in contact with both the polymer particles and dust, without chemically reacting with either the particles or the dust, such as through a surface crosslinking reaction.

The water-swellable or lightly crosslinked hydrophilic polymers that are usefully used in the present invention can be any of the known hydrophilic polymers which are capable of absorbing large quantities of fluids. In particular, water-absorbent polymers useful in this invention are water-absorbent polymers which contain carboxyl moieties. Preferably, at least about 0.01 equivalent of carboxyl groups are present per 100 grams of the water-absorbent resin.

Among preferred carboxyl-containing water absorbent polymers are hydrolyzates of starch-acrylonitrile graft copolymers, partially neutralized products of starchacrylic acid graft copolymers, saponification products of vinyl acetate acrylic ester copolymers, hydrolyzates of acrylonitrile copolymers, crosslinked products of hydrolyzates of acrylonitrile copolymers, hydrolyzates of acrylamide copolymers, crosslinked products of hydrolyzates of acrylamide copolymers, partially neutralized products of polyacrylic acids and crosslinked products of partially neutralized polyacrylic acids.

Examples of some suitable polymers and processes for preparing them are disclosed in U.S. Pat. Nos. 3,997,484; 3,926,891; 3,935,099; 4,090,013; 4,093,776; 4,340,706; 4,446,261; 4,683,274; 4,459,396; 4,708,997; 4,076,663; and 4,190,562, the relevant portions of which are incorporated herein by reference. Such hydrophilic polymers are prepared from water-soluble α,β-ethylenically unsaturated monomers such as monocarboxylic acids, polycarboxylic acids, acrylamide and their derivatives.

Suitable α,β-ethylenically unsaturated monomers include, for example, acrylic acid, methacrylic acid, crotonic acid, isocrotonic acid and alkali metal salts and ammonium salts thereof; maleic acid, fumaric acid, itaconic acid, acrylamide, methacrylamide and 2-acrylamido-2-methyl-1-propane sulfonic acid and its salts. The preferred monomers include acrylic acid and methacrylic acid and their respective salt forms such as alkali metal or ammonium salts.

The water-soluble monomers useful in the present invention may be used in amounts ranging from about 10 percent to about 80 percent by weight based on the total weight of the aqueous monomer solution. Preferably, the amount ranges from about 20 percent to about 60 percent based on the total weight of the aqueous monomer solution.

Optionally, the minor amounts of other water-soluble, unsaturated monomers, such as alkyl esters of the acid monomers, e.g., methyl acrylate or methyl methacrylate may be present. In addition, certain grafting polymers, such as, for example, polyvinyl alcohol, starch and water soluble or swellable cellulose ethers may be employed to prepare products having superior properties. Such grafting polymers, when employed, are used in amounts upto about 10 weight percent based on the α,β-ethylenically unsaturated monomer. Further, it may be advantageous to include a chelating agent to remove trace metals from solution, e.g., when a metal reaction vessel is employed. One such chelating agent is VERSENEX™ V-80 (an aqueous solution of the pentasodium salt of diethylenetriamine pentacetic acid) (Trademark of The Dow Chemical Company). Such chelating agents, when employed, are generally used in amounts between about 100 and about 2000 ppm based on the α,β-ethylenically unsaturated monomer.

It is desirable to obtain a level of conversion of monomer to polymer of at least about 95 percent. The polymerization may be carried out using acid monomers that are not neutralized or that have been neutralized or partially neutralized prior to the polymerization. Neutralization is conveniently achieved by contacting the aqueous monomer with an amount of basic material sufficient to neutralize between about 20 and about 95 percent of the acid groups present in the acid monomers. Preferably, the amount of basic material will be sufficient to neutralize between about 40 percent and 85 percent, and most preferably between about 55 percent and about 75 percent of the acid groups present in the acid monomers. When pre-neutralizing the monomer solution, it is important to control the neutralization conditions so that the heat of neutralization does not cause the premature polymerization of the monomer mixture. The neutralization is advantageously carried out at temperatures below about 40° C., preferably at temperatures below about 35° C.

Compounds which are useful to neutralize the acid groups of the monomer are typically those which will sufficiently neutralize the acid groups without having a detrimental effect on the polymerization process. Such compounds include alkali metal hydroxides, and alkali metal carbonates and bicarbonates. Preferably, the material used to neutralize the monomer is sodium or potassium hydroxide or sodium carbonate or potassium carbonate. In determining the desired degree of neutralization, care must be taken to ensure that the pH of the resulting crosslinked absorbent polymer, which will be contacted with or dispersed in an aqueous fluid to be absorbed, is maintained in a range appropriate for the applications for which the polymer is intended. Alternatively, the polymerization may be carried out employing unneutralized monomers and thereafter neutralizing, as is known in the art.

Conveniently, a conventional vinyl addition polymerization initiator is used in the polymerization of the water-soluble monomers and the crosslinking agent. A free radical polymerization initiator which is sufficiently soluble in the monomer solution to initiate polymerization is preferred. For example, water soluble persulfates such as potassium persulfate, ammonium persulfate, sodium persulfate, and other alkali-metal persulfates, hydrogen peroxide and water soluble azo-compounds such as 2,2'-azobis (2-amidinopropane HCl) may be used. Some of these initiators, such as hydrogen peroxide, can be combined with reducing substances such as sulfites or amines to form known redox type initiators. The total amount of initiators used may range from about 0.01 to about 1.0 weight percent, preferably about 0.01 to about 0.5 weight percent, based on the total weight of α,β-ethylenically unsaturated monomer reactants.

The water-absorbent resin will preferably be lightly crosslinked to render it water-insoluble. The desired crosslinked structure may be obtained by the copolymerization of the selected water-soluble monomer and a crosslinking agent possessing at least two polymerizable double bonds in the molecular unit. The crosslinking agent is present in an amount effective to crosslink the water-soluble polymer. The preferred amount of crosslinking agent is determined by the desired degree of absorption capacity and the desired strength to retain the absorbed fluid, i.e., the desired absorption under load (AUL). Typically, the crosslinking agent is used in amounts ranging from about 0.0005 to about 5 parts by weight per 100 parts by weight of $\alpha,\beta$-ethylenically unsaturated monomer used. More preferably, the amount ranges from about 0.1 to about 1 part by weight per 100 parts by weight of the $\alpha,\beta$-ethylenically unsaturated monomer. If an amount over about 5 parts by weight of crosslinking agent per 100 parts is used, the resulting polymer has too high a crosslinking density and exhibits a reduced absorption capacity and increased strength to retain the absorbed fluid. If the crosslinking agent is used in an amount less than about 0.0005 part by weight per 100 parts, the polymer has too low a crosslinking density, and when contacted with the fluid to be absorbed becomes sticky and exhibits a lower initial absorption rate.

While the crosslinking agent will typically be soluble in the aqueous solution of the $\alpha,\beta$-ethylenically unsaturated monomer, the crosslinking agent may be merely dispersible in such a solution, without negative implications. The use of such dispersing agents is disclosed in U.S. Pat. No. 4,833, 222, the relevant portions of which are incorporated herein by reference. Suitable dispersing agents include carboxymethyl cellulose suspending aids, methyl cellulose, hydroxypropyl cellulose, and polyvinyl alcohol. Such dispersing agentsare typically provided at a concentration between about 0.005 and about 0.1 weight percent, based on the total weight of $\alpha,\beta$-ethylenically unsaturated monomer reactants.

Typical crosslinking agents include monomers having in one molecule 2 to 4 groups selected from the group consisting of $CH_2$=CHCO—, $CH_2$=C($CH_3$)CO— and $CH_2$=CH—$CH_2$—. Exemplary crosslinking agents are diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylolpropane and pentaerythritol; triacrylates and trimethacrylates of trimethylolpropane and pentaerythritol; highly ethoxylated trimethylol propane triacrylate; tetracrylate and tetramethacrylate of pentaerythritol; and tetraallyloxyethane.

As noted in WO93/05080, the relevant portions of which are incorporated herein by reference, a certain class of crosslinking agents yields particularly preferred absorptive properties. Such preferred crosslinking agents include methylenebisacrylamide, bis(acrylamido)acetic acid and its salts, allyl acrylate, allyl methacrylate, and esters or amides having both a vinyl and an allyl functionality.

In a preferred embodiment for making polymers useful in the practice of this invention, an aqueous solution of the $\alpha,\beta$-ethylenically unsaturated monomer in the partially neutralized form, the crosslinking agent, the initiator and a grafting polymer substrate, if desired, is prepared.

The polymerization of the mixture may be initiated by elevating the temperature of the mixture containing the initiator or by using a redox-type initiator as described above. Generally, the temperature at which polymerization will begin ranges from about 20° C. to about 45° C. The temperature at which the polymerization is carried out is highly dependent on the type of monomers used and the specific initiator system employed. Preferably, the maximum temperature of polymerization ranges from about 50° C. to about 100° C., most preferably from about 60° C. to about 100° C. The method by which the temperature of the polymerization is controlled is not critical so long as sufficient cooling is present to remove the heat which is generated during the polymerization.

The resultant polymer is typically pre-sized and dried using means well-known in the art. Suitable drying means include fluidized bed driers, rotary driers, forced air ovens, through circulation band driers, etc. In some instances, drying will occur in two or more stages. In two-stage drying, the pre-sized polymer particles are partially dried in the first stage, e.g., the pre-sized polymer particles are dried to less than about 10 percent moisture level, preferably about a 5 percent moisture level. During initial drying, the pre-sized particles typically fuse together into sheets. Following the completion of drying, the polymer is more completely sized to form particles having an average diameter less than about 0.8 mm. During such sizing, dust, characterized by extremely small particle sizes may result, i.e., particle sizes less than or equal to 10 microns.

To improve absorptive properties, the dried particles may be heat treated in accordance with the procedures set forth in WO93/05080, and/or PCT Application PCT/US92/07611 filed on Sep. 9, 1992 the relevant portions of which are incorporated herein by reference. In particular, the dried particles are heated for a time sufficient to increase the modulus, centrifuge capacity, and/or the absorbency under load. Such heat treatment is preferably carried out at a temperature of at least about 170, more preferably of at least 180, and most preferably of at least about 190° C. Such heat treatment is preferably carried out at a temperature of less than about 250, more preferably less than about 240° C.

The time period for heat treatment should be sufficient to effect an improvement in absorptive properties. The exact times of heat treatment required will be affected by the equipment chosen, and can be determined empirically by examination of product properties. Preferably, the time is at least about 3 minutes, and more preferably at least about 5 minutes. If the time is too long, the process becomes uneconomical and a risk is run that the absorbent resin may be damaged. Preferably, the maximum time of heating is about 150 minutes or less, more preferably 60 minutes or less.

The method of heat treatment is not critical. For example, forced air ovens, fluidized bed heaters, heated screw conveyors, and the like may be successfully employed. If desired, the heated polymer may be remoisturized for ease in handling. While such remoisturization may serve to decrease the amount of unassociated dust, it may lead to clumping of the polymer product.

To reduce levels of unassociated dust and to inhibit the production of unassociated dust during handling of the polymer material, the dried and optionally heat treated particles are contacted with an effective amount of a dedusting agent. The dedusting agent will serve to adhere the dust to the larger polymer particles or to the walls of the mixing vessel or container in which the polymer is retained during handling, which will translate to reduced levels of unassociated dust in the finished polymer product at the various stages of handling. Moreover, the application of the dedusting agent to the polymer samples does not appear to detrimentally affect the performance or properties of the polymer, and further appears to reduce the tendency of the polymer to maintain a static charge.

As defined herein, the term "dedusting agent" means a material which, when applied to the polymer material, reduces the concentration of unassociated dust having a diameter of less than 10 microns by at least 90 weight percent, more preferably by at least 95 percent, and most preferably by at least 99 percent and/or which produces dedusted compositions comprising less than 2.5 ppm unassociated dust having a maximum diameter less than or equal to 10 microns.

Preferred dedusting agents will be hydrophilic organic materials which do not substantially penetrate into the interior of the polymer particles. Suitable dedusting agents will be hydrophilic, whereby water absorption by the coated particles is not impeded by the presence of the dedusting agent. Suitable dedusting agents will further be substantially nonpenetrating, such that the dedusting agent is present at the surface of the particles, even when provided in small amounts.

Exemplary dedusting agents include water-soluble, lower aliphatic polyols of greater than about 200 average molecular weight or lower polyalkylene glycols of about 400 to about 6000 average molecular weight. One preferred dedusting agent is a propylene oxide adduct of glycerol or a polyethylene glycol having an average molecular weight of about 500 to about 2000. In particular, exemplary dedusting agents include VORANOL™ polyether polyols such as VORANOL™ 2070, VORANOL™ 2100, and VORANOL™ 3100 polyether polyols (all available from The Dow Chemical Company); polyethylene glycols; glycerin; polyether alcohols, such as DOWANOL™ TPM tripropylene glycol methyl ether, DOWANOL™ TPnB tripropylene glycol n-butyl ether, and DOWANOL™ PPH propylene glycol phenyl ether (available from The Dow Chemical Company); TRITON™ X-100 surfactant (available from Union Carbide); TERGITOL™ 15-S-9 ethoxylated surfactant (available from Union Carbide); and nonionic surfactants having an HLB value of at least 7. Although it is not necessary to include water or solvents in the addition of the hydrophlic treatment to the dry polymer powder, amounts of water or solvents upto 20 times the amount of the hydrophilic treatment may be employed. When an organic solvent is employed, it will be preferable to utilize a solvent which is readily removed from the coated particles, e.g., by evaporation. One especially suitable organic solvent is methanol.

The dried and optionally heat treated particles and the dedusting agent should be contacted under conditions such that the particles can be coated with the dedusting agent, but such that the dedusting agent does not significantly diffuse into the internal structure of the particles. Preferably, such contacting will be conducted with some form of mechanical distribution, such that adequate distribution of the dedusting agent on the water-absorbent resin particles occurs. Examples of blending equipment/processes include simple tumbling of a jar, or blending in a conical dryer, ribbon blender, drum tumbler, etc. Moderate stirring, shaking, or even a short distance of conveying in a screw-conveyer can be sufficient for such adequate distribution of the dedusting agent over the particles, particularly if the particles are at an elevated temperature. Moderate grinding will also suffice, but is not necessary.

The temperature of contacting can be any temperature at which the dedusting agent does not significantly react with the carboxyl moieties of the absorbent resin polymer or evaporate. Such temperatures are typically at least from about 20 to about 150° C. It should be noted that elevated temperatures, i.e., those above ambient temperatures, improve the speed of coating of the particles.

While not necessary, the dedusted compositions may be further blended with a particulateflowabilityenhancer, suchasfumedsilica. Onesuchsilicaisanultra-microscopic silica having a BET surface area of at least 50 $m^2/g$ and a particle diameter less than or equal to 0.05 micron, such asAEROSIL™ 200 (available from Degussa Inc.). When utilized, the particulate flowability enhancer will be provided in an amount less than 10 weight percent, more typically less than 1 weight percent, based on the weight of the dedusted composition.

The subject invention provides a process for measuring the amount of unassociated matter having a diameter less than a predetermined size present in a water-swellable polymer composition. in the case of the Examples, the measurement process was used to determine the amount of unassociated matter having a maximum size less than or equal to 10 microns. The process is applicable, however,to measure the amount of unassociated matter having a diameter less than other predetermined sizes, the predetermined sizes typically consistent with either the manufacturer's or the purchaser's specifications. The inventive process comprises:

(a) placing the composition into the sample holder of a pulsed jet disperser;
(b) blasting the composition with air dried by passage through dehydration means; and
(c) determining the weight of particles in each of a plurality of size increments.

Dehydration means are suitable to reduce the amount of water present in the air to be used to blast the polymer composition. Suitable dehydration means include molecular sieve cartridges, dessicating materials, membranes, etc. An especially preferred dehydration means is a molecular sieve cartridge.

The dust levels of the coated samples may be measured as follows. Approximately 0.01 to 0.2 grams of the sample to be tested is placed in the sample holder of an AEROSIZER™ pulsed jet disperser, available from Amherst Process Instruments (Hadley, Massachusetts). The pulsed jet disperser is fitted with a 250 micron screen to prevent particles greater than 250 microns in diameter from entering the detector. The air delivered to the pulsed jet disperser is filtered using the factory supplied filter and is dried using a molecular sieve cartridge. The samples are blasted with the dried air, with the exhaust stream being directed to the detector and analyzed until the instantaneous count rate decays to less than 20 particles per second on the low sensitivity setting of the detector.

Measurements are made on separate portions of the samples and are averaged. For each portion, a determination is made of the total number of particles in each of 500 size increments evenly distributed logarithmically from 0.2 to 200 microns, the instrument exhibiting an approximate lower level of detection of 0.5 microns. The weight of material in each of these size increments is calculated using the following formula (1):

$$\text{Weight} = (\text{number of particles in an increment})(\text{density})(\pi)(\text{particle diameter}^3)/6. \quad (1)$$

For sodium polyacrylate superabsorbent materials, the density is assumed to be 1.60 g/cm$^3$.

The aggregate weight of unassociated material less than 10 microns is designated weight$_{dust}$. This weight is compared to the weight of sample originally introduced into the disperser, i.e., weight$_{sample}$. The percent dust is determined in accordance with equation (2):

$$\% \text{ dust} = 100(\text{weight}_{dust})/(\text{weight}_{sample}). \quad (2)$$

The following examples are provided for the purpose of explanation rather than limitation. It will be noted that the water-swellable polymer samples are standard commercially available materials. The actual composition of these materials is not relevant to the present invention, i.e., the invention would be expected to be applicable to any commercially available water-swellable polymer materials.

EXAMPLE ONE

A sample of a water-swellable polymer is obtained. The sample utilized is a 62 percent neutralized polyacrylate crosslinked with allyl methacrylate, which sample was fabricated from a monomer mixture containing 10 weight percent fine particles having an average diameter less than 140 mesh, and which sample was heat treated at a temperature of 200° C. As set forth in Tables One and Two, the indicated dedusting agent is added dropwise to the polymer in the indicated amount. The coated particles are then rolled for one hour to facilitate distribution of the dedusting agent on the particle surfaces.

The data collected with respect to the sample, as treated with a variety of dedusting agents, is set forth in Table One.

TABLE ONE

| Sample | Dedusting Agent | Unassociated dust (ppm) | Percent reduction in dust |
|---|---|---|---|
| 1 | none(control) | 7.10<br>8.20<br>8.90<br>Avg: 8.07 | — |
| 1A | 1 wt. percent VORANOL ™ 2070 polyether polyol | none detected | 100 |
| 1B | 0.25 wt. percent VORANOL ™ 2070 polyether polyol | none detected | 100 |
| 1C | 0.25 wt. percent glycerin | 0.0046<br>0.00055<br>0.0061<br>Avg: 0.0038 | >99 |
| 1D | 1 wt. percent glycerin | 0.012<br>0.0048<br>0.0048<br>0.0013<br>Avg: 0.0057 | >99 |

EXAMPLE TWO

A sample of a water-swellable polymer is obtained. The sample utilized is a 62 percent neutralized polyacrylate crosslinked with trimethylolpropane triacrylate. The sample is screened to a particle size between 20 and 325 mesh. As set forth in Table Two, the indicated dedusting agent is added dropwise to the polymer in the indicated amount. The coated particles are then rolled for one hour to facilitate distribution of the dedusting agent on the particle surfaces.

The data collected with respect to the sample, as treated with a variety of dedusting agents, is set forth in Table Two.

TABLE TWO

| Sample | Dedusting Agent | Unassociated dust (ppm) | Percent reduction in dust |
|---|---|---|---|
| 2 | none (control) | 7.03<br>20.3<br>17.4<br>9.6<br>Avg: 14 | — |
| 2A | 100 ppm VORANOL ™ 2070 polyether polyol | 0.84<br>0.82<br>2.2<br>Avg: 1.3 | 91 |
| 2B | 300 ppm VORANOL ™ 2070 polyether polyol | 0.087<br>0.071<br>0.21<br>Avg: 0.12 | 99 |
| 2C | 1000 ppm VORANOL ™ 2070 polyether polyol | 0.12<br>0.049<br>0.21<br>Avg: 0.082 | >99 |
| 2D | 3000 ppm VORANOL ™ 2070 polyether polyol | 0.15<br>0.16<br>0.11<br>Avg: 0.14 | 99 |
| 2E | 300 ppm DOWANOL ™ TPM tripropylene glycol methyl ether | 3.7<br>1.7<br>9.1<br>2.3<br>Avg: 4.2 | >99 |
| 2F | 3000 ppm. DOWANOL ™ TPnB tripropylene glycol n-butyl ether | 0.51<br>1.1<br>0.38<br>Avg: 0.66 | >99 |
| 2G | 3000 ppm DOWANOL ™ PPH polyether alcohol propylene glycol phenyl ether | 31<br>0.87<br>7.3<br>11<br>Avg: 13 | 99 |

EXAMPLE THREE

In accordance with Example One, a 62 percent neutralized polyacrylate crosslinked with allyl methacrylate, which sample was heat treated at a temperature of 200° C. and which was a sample was screened to a particle size between 20 and 325 mesh is treated with the amount of VORANOL™ 2070 polyether polyols as indicated in Table Three. About 10 grams of the treated polymer is added to an 8 ounce jar which is approximately half-filled with ceramic rod segmentswhich are about 7 mm long and about 7 mm in diameter. The jar is taped and is rolled on a roll mill for the period of time indicated in Table Three. Upon completion of milling, the balls are separated from the polymer sample using an ⅛ inch (3 mm) mesh screen. The amount of unassociated dust is measured as described above.

TABLE THREE

| Sample | Amount of VORANOL™ 2070 polyether polyol (ppm) | Amount of unassociated dust after the indicated number of minutes of milling (ppm) | | | | |
|---|---|---|---|---|---|---|
| | | 0 min. | 5 min. | 10 min. | 15 min. | 20 min. |
| 3A | none (Control) | 6.84 | 5.00 | | 154 | 532 |
| | | 6.12 | 72.2 | | 83.0 | 638 |
| | | 9.86 | 41.9 | | 138 | 688 |
| | | 6.75 | 76.7 | | 139 | 582 |
| | | | 63.8 | | 156 | |
| | | Avg. 7.39 | Avg: 51.9 | | Avg: 134 | Avg: 610 |
| 3B | 100 | 0.280 | | | | 5.09 |
| | | 0.800 | | | | 75.0 |
| | | 1.23 | | | | 97.0 |
| | | 0.960 | | | | 49.0 |
| | | Avg. 5.78 | | | | Avg:55.7 |
| 3C | 300 | 0.00910 | | 2.12 | | 74.8 |
| | | 0.0210 | | 3.12 | | 95.7 |
| | | 0.0320 | | 3.92 | | 60.9 |
| | | | | 7.98 | | 130 |
| | | | | 14.1 | | 181 |
| | | | | 11.8 | | 155 |
| | | | | 4.97 | | |
| | | | | 12.1 | | |
| | | Avg. 0.0207 | | Avg: 7.51 | | Avg: 116 |
| 3D | 1,000 | 0.0180 | | 0.160 | | 7.3 |
| | | 0.00620 | | 1.01 | | 15 |
| | | 0.0140 | | 1.08 | | 32 |
| | | 0.0490 | | 0.900 | | 9.9 |
| | | | | 3.20 | | 9.7 |
| | | | | 10.8 | | |
| | | Avg. 0.0218 | | Avg: 1.2 | | Avg: 14.8 |

As illustrated by the data set forth in Table Three, the application of the dedusting agent to the polymer improves the resistance of the polymer to attrition upon handling. In particular, a preferred inventive composition treated with 1,000 ppm VORANOL™ 2070 polyether polyol comprises no more unassociated dust upon roll milling for 10 minutes (1.24 ppm) than does an untreated unmilled sample (7.39 ppm). Further, a preferred inventive composition treated with 3,000 ppm VORANOL™ 2070 polyether polyol comprises only about twice as much unassociated dust upon roll milling for 20 minutes (14.7 ppm) than does an untreated unmilled sample (7.39 ppm); with the composition treated with 3,000 ppm VORANOL™ 2070 polyether polyol comprising less than 3 percent of the amount of unassociated dust present in an untreated sample which has been roll milled for 20 minutes (14.7 ppm, as compared to 610 ppm).

As further illustrated by the data set forth in Table Three, a preferred inventive composition treated with 1,000 ppm VORANOL™ 2070 polyether polyol comprises less than 35 ppm unassociated dust having a maximum diameter less than or equal to 10 microns upon being roll milled for 20 minutes in accordance with the milling procedure described in this Example, as compared with 610 ppm for an untreated sample. Further, another preferred inventive composition treated with at least 300 ppm VORANOL™ 2070 polyether polyol comprises no more than 15 ppm unassociated dust having a maximum diameter less than or equal to 10 microns upon being roll milled for 10 minutes in accordance with the milling procedure described in this Example, as compared with what is expected to be about 100 ppm for an untreated sample.

Moreover, the application of the dedusting agent to the polymer samples does not appear to detrimentally affect the performance or properties of the polymer. For instance, the flow time, bulk density, centrifuge capacity, 0.3 psi (21,000 dynes/cm$^2$) AUL and 60 minute extractables levels of samples 3A, 3B, 3C, and 3D are set forth in Table Four.

Flow time and bulk density are measured in accordance with ASTM D 1895-69; sixty minute 0.3 psi (21,000 dynes/cm$^2$) AUL is measured as described in U.S. Pat. No. 5,147,343; centrifuge capacity is determined as described in U.S. Pat. No. 4,286,082 except that an absorption time of 30 minutes rather than 3 to 5 minutes is employed; and the 60 minute extractables level is determined as described in U.S. Reissue Patent 32,649, with the relevant portions of each of the cited procedures/references being incorporated herein by reference.

TABLE 4

| Sample | Flow time (sec) | Bulk Density (g/mL) | Centrifuge Capacity (g/g) | 0.3 psi AUL (g/g) | 60 minute extractables (%) |
|---|---|---|---|---|---|
| 3A | 9.3 | 0.66 | 29.0 | 29.8 | 3.9 |
| 3B | 8.1 | 0.72 | 28.6 | 31.9 | 3.8 |
| 3C | 8.0 | 0.72 | 28.7 | 30.9 | 4.1 |
| 3D | 8.4 | 0.70 | 28.5 | 30.1 | 4.0 |

In view of the description and examples, other embodiments will be readily ascertained by one having skill in the art. Accordingly, the scope of the invention shall be limited only by the claims set forth below.

We claim:

1. A composition comprising free-flowing water-absorbent lightly crosslinked water-insoluble superabsorbent polymer particles, the particles bearing on their surface from about 100 ppm to 3000 ppm, based on the weight of the particles, of a physical coating of a liquid hydrophilic organic dedusting agent, wherein the composition comprises no more than 2.5 ppm unassociated dust having a maximum diameter less than or equal to 10 microns, and wherein the composition is characterized by a 60 minute 0.3 psi (21,000 dynes/cm$^2$) Absorption under Load greater than 20 grams/gram, and wherein the composition is substantially free of inorganic powder.

2. The composition of claim 1 wherein the composition comprises no more than 35 ppm unassociated dust having a maximum diameter less than or equal to 10 microns upon being roll milled for 20 minutes.

3. The composition of claim 1 wherein the composition comprises no more than 15 ppm unassociated dust having a maximum diameter less than or equal to 10 microns upon being roll milled for 10 minutes.

4. The composition of claim 1 wherein the dedusting agent is a polyol, an ethoxylated surfactant, or a nonionic surfactant having an HLB value of at least 7.

5. The composition of claim 4 wherein the dedusting agent is a polyether polyol, a polyethylene glycol or glycerol.

6. The composition of claim 1, wherein the dedusting agent is provided in an amount of from about 300 ppm to 1,000 ppm, based on the weight of the particles.

7. The composition of claim 6 wherein the dedusting agent is a polyether polyol.

8. The composition of claim 6 wherein the dedusting agent is a polyethylene glycol.

9. The composition of claim 6 wherein the dedusting agent is glycerol.

10. A composition consisting essentially of a free flowing water-absorbent lightly crosslinked water-insoluble partially neutralized polyacrylic acid polymer particles, the particles bearing on their surface from about 300 ppm to 1,000 ppm, based on the weight of the particles, of a liquid hydrophilic organic dedusting agent, wherein the composition comprises no more than 2.5 ppm unassociated dust having a maximum diameter less than or equal to 10 microns, and wherein the composition is characterized by a 60 minute 0.3 psi (21,000 dynes/cm$^2$) Absorption under Load greater than 20 grams/gram and wherein the composition is substantially free of inorganic powder.

11. A process for the preparation of free-flowing water-absorbent lightly crosslinked water-insoluble polymer particles comprising:

(a) preparing a water-swellable hydrogel by a gel polymerization process;

(b) drying and sizing the hydrogel to form a composition comprising dried and sized particles, the composition comprising a first amount of unassociated dust having a maximum diameter less than or equal to 10 microns; and (c) contacting the composition with from about 100 ppm to 5000 ppm, based on the weight of the particles, of a physical coating of a hydrophilic liquid organic dedusting agent, which is substantially free of inorganic powder, to form a dedusted composition, wherein the dedusted composition is characterized by a 60 minute 0.3 psi (21,000 dynes/cm$^2$) Absorption under Load greater than 20 grams/gram and wherein the dedusted composition comprises a second amount of unassociated dust having a maximum diameter less than or equal to 10 microns, the second amount being less than about 10 percent of the first amount.

12. The process of claim 11, wherein the second amount is less than about 2.5 ppm.

13. The process of claim 12, wherein the second amount is less than about 1 ppm.

14. The process of claim 13, wherein the second amount is less than about 0.2 ppm.

15. The process of claim 11 wherein the composition is characterized by the tendency to generate a second amount of unassociated dust having a maximum diameter less than or equal to 10 microns upon roll milling of the attrition resistant composition for 10 minutes, the second amount being less than or equal to the first amount.

16. The process of claim 11, wherein the dedusting agent is a polyol, an ethoxylated surfactant, or a nonionic surfactant having an HLB value of at least 7.

17. The process of claim 16, wherein the dedusting agent is a polyether polyol, a polyethylene glycol or glycerol.

18. The process of claim 17 wherein the dedusting agent is provided in an amount from about 300 ppm to 3000 ppm, based on the weight of the particles.

19. The process of claim 17 wherein the dedusting agent is a polyether polyol.

20. The process of claim 17 wherein the dedusting agent is a polyethylene glycol.

* * * * *